Patented Mar. 14, 1944

2,344,330

UNITED STATES PATENT OFFICE 2,344,330

CONVERSION OF HYDROCARBONS

John F. Sturgeon, Chicago, Ill., assignor to Universal Oil Products Company, Chicago, Ill., a corporation of Delaware No Drawing. Application March 5, 1942, Serial No. 433,443

11 Claims. (Cl. 260—673.5)

This is a continuation-in-part of my co-pending application Serial No. 293,923, filed September 8, 1939, now U. S. Patent number 2,278,223.

The present invention relates to the catalytic treatment of aliphatic and cyclo-aliphatic hydrocarbons for the production of aromatic hydrocarbons therefrom and is more specifically directed to the treatment of aliphatic hydrocarbons having at least 6 carbon atoms in straight chain arrangement and cyclo-aliphatic hydrocarbons having 6 carbon atoms in the ring.

The invention is specially concerned with the use of novel types of catalysts for effecting the conversion of 6 carbon atom aliphatic hydrocarbons by reactions involving dehydrogenation and ring closure and the direct dehydrogenation of cycloparaffinic hydrocarbons of the nature of cyclohexane and its alkyl derivatives to produce aromatic hydrocarbons in both instances. The invention can thus be applied to the aromatization and hence the reforming of gasolines and naphthas to increase their antiknock ratings and hence their suitability for use in high compression internal combustion engines.

In one specific embodiment the present invention comprises a process for the aromatization of hydrocarbons containing at least 6 carbon atoms in straight chain or ring arrangement by subjecting said hydrocarbons to contact with catalysts prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining to produce an active catalyst.

The essential feature of the present invention is the use in cyclization and aromatization reactions of catalyst composites containing an active dehydrogenating component produced by steps involving freezing and then thawing primarily composited metal oxide gels or hydrous oxides to eliminate water and subsequent steps involving washing to remove impurities, forming and calcining. It has been found that in the manufacture of the preferred catalysts the expedient of freezing and thawing to remove water and facilitate washing of precipitated gelatinous materials is applicable to materials of both a simple and a complex character. Broadly speaking, it has been found to be applicable to all potentially catalytic materials which are capable of being precipitated in the form of a gel or a hydrous oxide. Thus, for example, the expedient of freezing and thawing has been found to be applicable to the gels or hydrous oxides of the following elements: Magnesium, zinc and cadmium in the right-hand column of group II of the periodic system, aluminum in the right-hand column of group III, titanium, zirconium, cerium and thorium in the left-hand column of group IV, silicon and tin in the right-hand column of group IV, vanadium, columbium and tantalum in the left-hand column of group V, chromium, molybdenum and tungsten in the left-hand column of group VI and iron, nickel and cobalt constituting the fourth series of group VIII. Since substantially all of the oxides of these elements are alternatively utilizable in catalyst composites having hydrogenating-dehydrogenating activity, it is readily seen that a considerable number of alternative composite materials can be produced, although obviously the catalytic activity of the different possible composites in different hydrocarbon aromatization reactions will not be exactly equivalent. Some of the oxides of these elements possess greater dehydrogenating activity than others and some of the metals produced by the reduction of the oxides have greater activity than their oxides as is the case with iron, nickel and cobalt. The oxides of chromium, molybdenum, tungsten and vanadium all possess good activity in reactions involving the dehydrocyclization of aliphatic hydrocarbons containing at least 6 carbon atoms in straight chain arrangement although even in this group there are variations in activity in any given reaction. The oxides of silicon, titanium, zirconium, cerium and thorium usually have substantially lower dehydrocycling potency than those of chromium, molybdenum, tungsten and vanadium and among those of generally lower potency cerium oxides are usually highest in activity. The first named oxides and also the oxides of aluminum, magnesium, zinc and cadmium have relatively low dehydrogenating and cycling activity and when other oxides are present in complexes they are commonly looked upon as carrying or spacing agents although they sometimes exhibit specific promoting effects which are not exactly in accord with their individual activities in such reactions. Aluminum oxide prepared by calcining a hydrated natural or precipitated alumina at a temperature of from about 752 to about 950° F. is a particularly good material to be used in association with the oxides of chromium, molybdenum, tungsten and vanadium to foster dehydrocyclization reactions to form aromatic hydrocarbons. As a rule, magnesium oxide is used as a minor constituent of such composites to render them more suitable when they are subjected to relatively high temperatures in reactivation with oxidizing gas mixtures after a period of service. Zinc and cadmium oxides are not always suitable for use in composites for effecting the types of reactions which characterize the present invention since their presence in more than minor amounts may tend to promote straight dehydrogenation rather than cyclization reactions.

The present invention comprises the use in hydrocarbon aromatization reactions of catalysts made by the primary formation of hydrogels of metal oxides by different types of reactions depending upon the character of the particular compounds involved. In the case of compounds of most of the elements already mentioned hydrous oxides may be precipitated or gels formed by the addition of basic precipitants to solutions of salts of the elements using, for example, ammonium hydroxide, ammonium carbonate, ammonium sulfides or their equivalents. For example, hydrogels of alumina and zirconia may be formed by the addition of ammonium hydroxide to solutions of aluminum and zirconium salts or an alumina hydrogel may be formed by mixing a solution of an aluminum salt with an aqueous solution of an alkali metal aluminate. As further examples, vanadium pentoxide may be precipitated as an amorphous hydrous mass by the addition of a mineral acid to a concentrated solution of an alkali or alkaline earth vanadate or hydrous vanadium sesquioxide is precipitated when an aqueous solution of vanadium trichloride is treated with ammonia. A precipitate of hydrated silica may be formed by acidifying a solution of an alkali metal silicate. These examples are only mentioned as instances of methods which may be employed to form primary hydrous oxides and not with the intent of limiting the scope of the invention to the use of the specific materials mentioned since its scope includes the primary formation of hydrous oxides or hydrogels by any method found suitable or advantageous. Gels of hydrous oxides may be formed separately and mixed or they may be coprecipitated or separately precipitated gels may be separately frozen and thawed and then mixed prior to final washing.

Catalysts particularly useful in the present process consist essentially of aluminum and chromium oxides and may be made by the primary formation of alumina-chromia hydrogels by any alternative procedure. An alumina hydrogel may be precipitated from a solution of an aluminum salt by means of the introduction of a basic material, such as ammonium hydroxide, ammonium carbonate, ammonium sulfide, or their equivalents, or alternatively, an alumina hydrogel may be formed by mixing a solution of an aluminum salt with an aqueous solution of sodium aluminate. Alumina hydrogel prepared by this or any other method may be composited with similarly prepared hydrogels of chromia and magnesia, the resulting composite separated by decantation or filtration from the readily removable water, and the hydrogel then frozen. The exact conditions optimum for the freezing operation, such as temperature, rate and time of freezing are dependent upon the gel composition in question, its water content, and other factors. During freezing the hydrogel composites lose their gel structure so that the thawing of the frozen materials produces an aqueous solution and fine powder or granular material which may be readily separated from the aqueous solution. The solid powdered material obtained from the thawing of the hydrogel may then be washed with water to remove water soluble impurities. If desired, the powdered material may be ground further and formed into particles by extrusion, pelleting, or other similar methods with or without the addition of promoters prior to the particle forming operation. The pelleted or otherwise formed catalyst particles are then calcined at a temperature which may vary from about 900 to about 1500° F. to produce active catalytic material.

It is best practice in the final steps of preparation of aluminum oxides for use in dehydrogenation catalyst composites to calcine them for some time, before or after the addition of a chromium compound, at a temperature between about 900 and about 1500° F. Such calcination treatment does not cause complete dehydration of the hydrated oxides but gives catalytic material of good strength and porosity so that they are able to resist for a long time the deteriorating effects of the service and reactivation period to which they are subjected.

The element chromium has several oxides, the four best known being $CrO$, $Cr_2O_3$, $Cr_3O_4$, and $CrO_3$. The sesquioxide $Cr_2O_3$ is readily produced by heating salts of chromium or the trioxide in hydrogen or hydrocarbon vapors at temperatures above 575° F. The dioxide (chromic chromate) has been considered to be an equi-molecular mixture of the trioxide and the sesquioxide. The oxides are readily developed on the surfaces and in the pores of alumina granules by utilizing primary solutions of chromic acid, $H_2CrO_4$, or chromic nitrate, $Cr(NO_3)_3$. The calcination of the chromic acid, the nitrate, or a precipitated trihydroxide produces primarily the trioxide which is then reduced to the sesquioxide to furnish an active catalyst for use in reactions of the present character.

The advantages of utilizing freezing of hydrogel composites during the preparation of catalysts therefrom are that the frozen and thawed catalytic composites may be washed free of alkali metal compounds more easily than is possible when operating with the original hydrogels. It is usually advisable to dry the composites separated from the water after thawing before they are finally washed since some hydrogels such as those of alumina, if not carefully dried at this point, sometimes exhibit a tendency to revert to a gelatinous condition and make thorough washing difficult. If desired, the drying prior to final water washing may be done by using such solvents as alcohol and acetone. Overheating should be avoided. Frequently grinding of the composite is unnecessary before forming into catalyst particles and several other drying, grinding and screening operations are avoided which must ordinarily be made when removal of impurities from precipitated hydrogel catalysts is effected mainly by washing. When grinding of the catalyst is unnecessary there is less danger of contaminating it with metals and thus impairing its activity. Also, the apparent density of the catalyst prepared from a frozen hydrogel composite is less than that of similar catalysts prepared from the same kind of hydrogels which have been merely washed to remove water soluble impurities.

Experiments have shown that the addition of relatively small proportions of magnesia or of other magnesium compounds, such as the chromate or hydroxide to alumina-chromia catalysts leads to the production of improved dehydrogenation catalysts with longer life and less fouling by carbon deposition than occurs in the presence of similar alumina-chromia mixtures containing no magnesium compounds. The addition of magnesia to such alumina-chromia composites apparently results in the formation of a dehydrogenation catalyst with a spinel type of structure and a long active life. Such an increase in the dehydrogenating life of this type of catalyst is possibly due to the magnesia exerting and inhibiting effect upon the crystallization of the active components of the catalyst at the relatively high temperatures to which it is subjected during periods of use and reactivation. This same effect is noticeable when magnesia as well as other divalent oxides such as those of zinc and cadmium are added to catalyst composites containing trivalent oxides.

The value in aromatization reactions of different composites and the activity of composites having different proportions of oxide ingredients have been found to vary considerably with the methods of preparation of the composites. In the case of alumina-chromia-magnesia catalysts the most effective and economical proportions comprise major amounts of alumina and relatively minor amounts of chromia and magnesia; while in other cases best results are obtained when employing major amounts of catalyst components having relatively high dehydrogenating and cycling activities and minor amounts of oxides having relatively low catalytic activity such as alumina, magnesia, and zinc and cadmium oxides.

In preparing catalysts of the alumina-chromia-magnesia type, alumina and chromia may be composited and mixed with relatively minor amounts of magnesia in several ways to form composites which may be calcined at a temperature between about 900° and about 1500° F. to produce active dehydrogenating catalysts.

According to one method of preparation a precipitated alumina hydrogel is prepared by addition of a base to an aluminum salt, as the chloride, nitrate, or sulfate, or precipitated alumina hydrogel may be formed by the addition of an acid such as hydrochloric or sulfuric, or of a solution of an aluminum salt to a sodium aluminate solution. Alumina hydrogel so formed is frozen and then thawed so as to break down the gel structure producing hydrated aluminum oxide in powdered form, which is separated from mechanically removable water, washed to remove water soluble impurities, and dried. The dried powder may then be impregnated with chromic acid dissolved in water, and the desired quantity of magnesium oxide may then be added to the impregnated powder. The resultant composite of hydrated oxides of aluminum, chromium, and magnesium is the dried, formed into particles, and calcined.

According to a second method hydrated aluminum oxide is prepared by precipitation, and the hydrogel is frozen, washed, and dried as in the first method. Then the hydrated aluminum oxide is calcined at a temperature between about 900 and about 1500° F. to produce activated alumina which is impregnated with chromic acid solution and the desired amount of magnesium hydroxide is added.

By a third method of preparation aluminum and chromium salts, such as the nitrates, are dissolved in water and a mixture of alumina and chromia hydrogels are precipitated therefrom by addition of a base, such as ammonium hydroxide, ammonium carbonate, or any other suitable precipitant. The resultant hydrogel composite is frozen, thawed, filtered, washed, and dried, and the desired proportion of magnesium hydroxide may then be added to the dried alumina-chromia composite which is next formed into particles and calcined to produce an active catalyst. Instead of adding magnesium hydroxide to the alumina-chromia composite it is also possible to effect the same improvement in the final catalyst by similarly adding magnesium chromate. Also, alumina, chromia and magnesia hydrogels formed separately by precipitation may be admixed to produce the desired composite catalyst.

In the operation of the present process, a solid composite catalyst prepared according to some one of the foregoing briefly outlined methods may be used as a filler in reaction tubes or chambers in the form of particles of graded size or small pellets, and the vapors of the hydrocarbon or hydrocarbon mixture to be aromatized are passed through the catalyst after being heated to a selected temperature, usually from about 750 to about 1400° F. The temperatures most commonly used, however, are from about 900 to about 1200° F. The catalyst tubes or chambers may also be heated exteriorly to maintain the proper temperature for the reaction. The pressures employed may be subatmospheric, atmospheric, or slightly superatmospheric of from about 50 to about 100 pounds per square inch. While pressures up to approximately 500 pounds per square inch may be employed in some cases, pressures of the order of atmospheric or below are frequently preferable. The time during which the vapors of hydrocarbons are exposed to processing conditions in the presence of the catalysts is comparatively short, usually below 20 seconds and preferably lower than 6 seconds. The time of catalytic contact employed will vary with the activity of the catalyst used as well as with the temperature employed with individual hydrocarbons or mixtures thereof.

As an alternative mode of operation using catalysts of the present character, they may be employed in finely divided condition in stationary or moving masses through which the vapors of the hydrocarbons to be treated are passed. Operations may be conducted so that there is substantially no mechanical loss of catalyst material from the reactor by the carrier action of such reactor streams or the rate of flow of vapors may be adjusted so that definite amounts of powdered catalysts are carried out and later separated from vapors, and reactivated by contacting with oxygen-containing gas mixtures.

Since the usual method of operating commercial plants is to utilize units connected in parallel so that one may be processing a hydrocarbon charge while the other is being reactivated by heating in an oxygen-containing gas, it is preferable to so balance conditions in the two parts of the cycle that the times of processing and reactivation are substantially equal. A further problem to be solved by trial is the question of the length of the operating cycle, since best overall results are obtained in continuous plants when operations are conducted for relatively short intervals followed by a correspondingly short time of reactivation rather than by allowing the catalyst particles to become contaminated excessively by carbonaceous deposits.

The products from the catalytic reactors may be subjected to any type of separation suitable for the recovery of desired products and the production of recycle materials which are returned for further processing. Thus, for example, the products from the treatment of normal heptane to produce toluene may be fractionated to separate hydrogen and light gases, the desired toluene, and unconverted normal heptane which is recycled to further contact with the catalyst. Incidentally formed olefins may be removed by any physical or chemical methods found applicable or if they are of the type suitable for further cyclization treatment they may be returned with the unconverted normal heptane.

When the activity of a catalyst of the present type begins to diminish it is readily reactivated by the simple expedient of oxidizing with air or other oxidizing gas at a moderately elevated temperature, usually within the range employed in the dehydrogenating reactions. This oxidation effectively removes most of the carbon deposits which contaminate the surface of the particles and decrease their efficiency. It is characteristic of the present types of catalysts that they may be reactivated repeatedly without substantial loss of catalytic efficiency.

The following illustrative examples are introduced to indicate the nature of the results obtainable in a characteristic aromatization reaction using the present preferred types of catalysts. It is not intended, however, that the data introduced should operate to precisely limit the scope of the invention in exact accordance with the data.

Two comparative dehydrogenation catalysts are prepared so as to have compositions corresponding to the molecular ratios of

$3Al_2O_3 : 3Cr_2O_3 : 2MgO$

One of these composites is prepared by precipitating aluminum hydroxide from aluminum sulfate solution by the addition of aqueous ammonia, repeatedly washing to remove water soluble impurities, and drying to produce aluminum hydroxide powder which is impregnated with aqueous chromic acid solution to which precipitated magnesium hydroxide has been added previously. The other composite is prepared by the method described in this specification which involves freezing of a precipitated aluminum hydroxide hydrogel to break up its gelatinous structure and form powdered aluminum hydroxide which is dried at a temperature of about 220° F. and washed to remove water soluble impurities.

The two composites prepared as above are dried, formed into 3 x 3 mm. particles by a pelleting machine, and then calcined in air for 10 hours at 1472° F. after which they are utilized to treat normal heptane at 975° F. under atmospheric pressure using a liquid hourly space velocity of 1 and a processing period of 45 minutes in length.

In operating with the catalysts prepared by the freezing and thawing method an overall yield of 75 per cent of toluene is obtained based on the volume of the original heptane charged when unconverted heptane and normally liquid olefins are recycled to further contact with the catalysts. The overall yield obtained with the catalysts prepared by the previously used method of washing the gelatinous materials is 70 per cent and it is found that the gallons of toluene produced per pound of catalyst in the case of frozen and thawed material before the catalytic activity falls below a practical point is 18 gallons as compared with 15 gallons obtained with the catalyst produced by the older method.

I claim as my invention:

1. A process for the treatment of a hydrocarbon containing six carbon atoms in ring arrangement to produce aromatic hydrocarbons therefrom which comprises subjecting said hydrocarbons to contact with a catalyst prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining to produce an active catalyst.

2. A process for the treatment of an aliphatic hydrocarbon containing at least six carbon atoms in straight chain arrangement to produce aromatic hydrocarbons therefrom by dehydrogenation and ring closure which comprises subjecting said hydrocarbon to contact with a catalyst prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining to produce an active catalyst.

3. A process for the treatment of a paraffinic hydrocarbon containing at least six carbon atoms in straight chain arrangement to produce aromatic hydrocarbons therefrom by dehydrogenation and ring closure which comprises subjecting said hydrocarbon to contact with a catalyst prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining to produce an active catalyst.

4. A process for the treatment of an olefinic hydrocarbon containing at least six carbon atoms in straight chain arrangement to produce aromatic hydrocarbons therefrom by dehydrogenation and ring closure which comprises subjecting said hydrocarbon to contact with a catalyst prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining to produce an active catalyst.

5. A process for the treatment of a gasoline boiling range hydrocarbon fraction for improving the anti-knick value thereof which comprises subjecting said fraction to contact with a catalyst prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying, and washing to remove water soluble impurities, forming into particles and calcining to produce an active catalyst.

6. A process for the treatment of a hydrocarbon containing six carbon atoms in ring arrangement to produce aromatic hydrocarbon therefrom which comprises subjecting said hydrocarbons at a temperature of from about 750 to about 1400° F. to contact with a catalyst prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining to produce an active catalyst.

7. A process for the treatment of an aliphatic hydrocarbon containing at least six carbon atoms in straight chain arrangement to produce aromatic hydrocarbons therefrom by dehydrogenation and ring closure which comprises subjecting said hydrocarbon at a temperature of from about 750 to about 1400° F. to contact with a catalyst prepared by forming mixed metal oxide hydrogels containing at least one component having a hydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining to produce an active catalyst.

8. A process for the treatment of an aliphatic hydrocarbon containing at least six carbon atoms in straight chain arrangement to produce aromatic hydrocarbons therefrom by dehydrogenation and ring closure which comprises subjecting said hydrocarbon at a temperature of from about 750 to about 1400° F. to contact with a catalyst prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining at a temperature of from about 750 to about 1400° F. to produce an active catalyst.

9. A process for the treatment of an aliphatic hydrocarbon containing at least six carbon atoms in straight chain arrangement to produce aromatic hydrocarbons therefrom by dehydrogenation and ring closure which comprises subjecting said hydrocarbon at a temperature of from about 750 to about 1400° F. to contact with a catalyst prepared by forming a precipitated metal oxide hydrogel composite containing a hydrogel of alumina and at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, forming into particles and calcining at a temperature of from about 750 to about 1400° F. to produce an active catalyst.

10. A process for the treatment of an aliphatic hydrocarbon containing at least six carbon atoms to produce aromatic hydrocarbons therefrom which comprises subjecting said hydrocarbon to contact with a catalyst prepared by forming mixed metal oxide hydrogels containing at least one component having a dehydrogenating catalytic activity in a partially dehydrated condition, filtering the hydrogels to separate mechanically removable water, freezing and then thawing the filtered hydrogel to destroy its gelatinous structure, filtering, drying and washing to remove water soluble impurities, and calcining to produce an active catalyst.

11. A process for the treatment of an aliphatic hydrocarbon containing at least six carbon atoms in straight chain arrangement to produce aromatic hydrocarbons therefrom by dehydrogenation and ring closure which comprises subjecting said hydrocarbon at a temperature of from about 900 to about 1300° F. to contact with a catalyst prepared by forming a precipitated metal oxide hydrogel composite containing a hydrogel of alumina and at least one component having a dehydrogenating catalytic activity in a partially dehydrated condition selected from the group consisting of the oxides of vanadium, columbium and tantalum, filtering the hydrogels to separate mechanically removable water, freezing and then thawing the filtered hydrogel to destroy its gelatinous structure, filtering, drying and washing to remove water soluble impurities, forming into particles and calcining at a temperature of from about 900 to about 1500° F. to produce an active catalyst.

JOHN F. STURGEON.